(12) United States Patent
Burlingham et al.

(10) Patent No.: US 7,568,289 B2
(45) Date of Patent: Aug. 4, 2009

(54) HANDHELD OPTICAL DISTANCE MEASUREMENT DEVICE

(75) Inventors: Aragon Burlingham, Burlingame, CA (US); Andrew Butler, Palo Alto, CA (US); Calvin Chan, Allway Gardens (HK); Mark Della Bona, Los Altos, CA (US); Jeffery Fincher, San Carlos, CA (US); Daniel Hill, Portola Valley, CA (US); Bob Lewis, Bend, OR (US); Chris Tacklind, Palo Alto, CA (US)

(73) Assignee: Robert Bosch Company Limited, Hong Kong (CN)

( * ) Notice: Subject to any disclaimer, the term of this patent is extended or adjusted under 35 U.S.C. 154(b) by 0 days.

(21) Appl. No.: 11/298,550

(22) Filed: Dec. 8, 2005

(65) Prior Publication Data

US 2006/0201006 A1 Sep. 14, 2006

Related U.S. Application Data

(60) Provisional application No. 60/661,458, filed on Mar. 14, 2005.

(51) Int. Cl.
*G01C 9/06* (2006.01)
(52) U.S. Cl. ........................................... 33/284
(58) Field of Classification Search .............. 33/284, 33/285, 281, 282, DIG. 21
See application file for complete search history.

(56) References Cited

U.S. PATENT DOCUMENTS

| | | | |
|---|---|---|---|
| 4,949,089 A | 8/1990 | Ruszkowski, Jr. | |
| 5,291,262 A | 3/1994 | Dunne | |
| 5,903,235 A | 5/1999 | Nichols | |
| 5,933,224 A * | 8/1999 | Hines et al. | 356/4.01 |
| 6,064,398 A * | 5/2000 | Ellenby et al. | 345/633 |
| 6,108,071 A | 8/2000 | Landry | |
| 6,288,775 B1 * | 9/2001 | Tanaka | 356/5.07 |
| 6,871,413 B1 * | 3/2005 | Arms et al. | 33/366.11 |
| 6,912,888 B2 * | 7/2005 | Stierle et al. | 73/1.79 |
| 7,142,981 B2 * | 11/2006 | Hablani | 701/213 |
| 7,176,887 B2 * | 2/2007 | Marvit et al. | 345/156 |
| 7,301,528 B2 * | 11/2007 | Marvit et al. | 345/156 |
| 7,301,536 B2 * | 11/2007 | Ellenby et al. | 345/419 |
| 2005/0057745 A1 | 3/2005 | Bontje | |
| 2005/0128465 A1 * | 6/2005 | Skultety-Betz et al. | 356/4.01 |
| 2006/0201006 A1 * | 9/2006 | Burlingham et al. | 33/284 |

* cited by examiner

*Primary Examiner*—Yaritza Guadalupe-McCall
(74) *Attorney, Agent, or Firm*—Greer, Burns & Crain, Ltd.

(57) ABSTRACT

A handheld measurement device of an embodiment of the invention includes a distance measurement engine and an angular position measurement engine. A controller controls the distance measurement engine and associates an elevation, azimuth position, or relative angular position from the angular position measurement engine with distance measurements taken from the elevation engine. In preferred operations, each point measured from a target under the control of a user is automatically associated with an elevation and/or azimuth position obtained from the angular position engine. Preferably, the controller determines a set of relative coordinates in space for a plurality of related target points. The controller may then calculate a variety of useful distances, areas, volumes, etc., regarding the plurality of target points.

15 Claims, 6 Drawing Sheets

US 7,568,289 B2

HANDHELD OPTICAL DISTANCE MEASUREMENT DEVICE

PRIORITY CLAIM AND REFERENCE TO RELATED APPLICATION

This application claims priority under 35 U.S.C. §119 from prior provisional application Ser. No. 60/661,458, which was filed on Mar. 14, 2005.

FIELD OF THE INVENTION

The field of the invention is measurement devices. Applications for devices of the invention include, for example, construction and estimation.

BACKGROUND

There are many applications in construction and estimation requiring the remote measurement of a distance, area or volume using multiple points along a surface. In surveying, the capability to locate arbitrary points in space is provided by devices often referred to as total stations or Theodolites. These tripod-mounted devices can measure azimuth, elevation and the distance to very high precision, (millimeters/arc seconds) to establish the location in polar coordinates. They can use precision ruled scales or angle encoders to measure angle and distance can be provided, for example, by optical triangulation. These devices are often expensive and cumbersome, and provide more precision than is necessary in many cases. Their use is not always convenient.

In many instances, a high degree of measurement accuracy to selected points is not required. For example, the measurement of the height, width or area of a physical opening or surface is often required to estimate the area of material to cover a region or to estimate the size of a window or door. As another example, in excavation it is important to estimate the volume of material to be removed from or added to a site. In these instances, a lesser degree of precision is required than in surveying applications. Less cumbersome equipment is also convenient.

Handheld distance measurement devices address this need to some extent. Typical devices use an optical engine to measure distance. For example, the emission, sensing and triangulation of multiple beams can be used to determine the distance of a given point. Other handheld distance measurement devices uses a phase difference optical distance measurement engine. A beam is emitted by the optical distance measurement engine and the reflection of the beam from a target is sensed. The phase difference of the reflected beam relative to the emitted beam is indicative of the distance. Beams of multiple frequencies may be used to improve accuracy. Such optical distance measurement engines or other distance measurement engines of typical handheld devices can provide suitably precise distance measurements when a measurement is taken. However, the control and timing of the measurement is conducted in a manner that often fails to take advantage of the precision offered by the distance measurement engine.

As an example, an interesting class of measurement is the measurement of a distance on level or at a particular angle of elevation relative to level. Typical handheld distance measurement devices include a spirit vial to assist a user in determining level or elevation. A distance measurement on level involves the operator of the handheld distance measurement device interpreting the spirit vial and manually activating the time of measurement. This is a difficult technique to repeat for a given measurement.

SUMMARY OF THE INVENTION

A handheld measurement device of an embodiment of the invention includes a distance measurement engine and an angular position measurement engine. A controller controls the distance measurement engine and associates an elevation, azimuth position, or relative angular position from the angular position measurement engine with distance measurements taken from the elevation engine. In preferred operations, each point measured from a target under the control of a user is automatically associated with an elevation and/or azimuth position obtained from the angular position engine. Preferably, the controller determines a set of relative coordinates in space for a plurality of related target points. The controller may then calculate a variety of useful distances, areas, volumes, etc., regarding the plurality of target points.

A measurement device according to preferred embodiments of the invention can take simple and complex measurements. A measurement device of an exemplary embodiment of the invention is a low-cost, hand-held device that is capable of measuring the relative position between two or more measurement points in a two- or three-dimensional coordinate space. Preferred embodiment measurement devices use point measurements to determine, for example, estimates of chord distance, the area boarded by measurement points or volume, inclinations of surfaces, measurements on level or measurements on a selected angle of inclination.

DETAILED DESCRIPTION OF THE PREFERRED EMBODIMENTS

Figure 1:
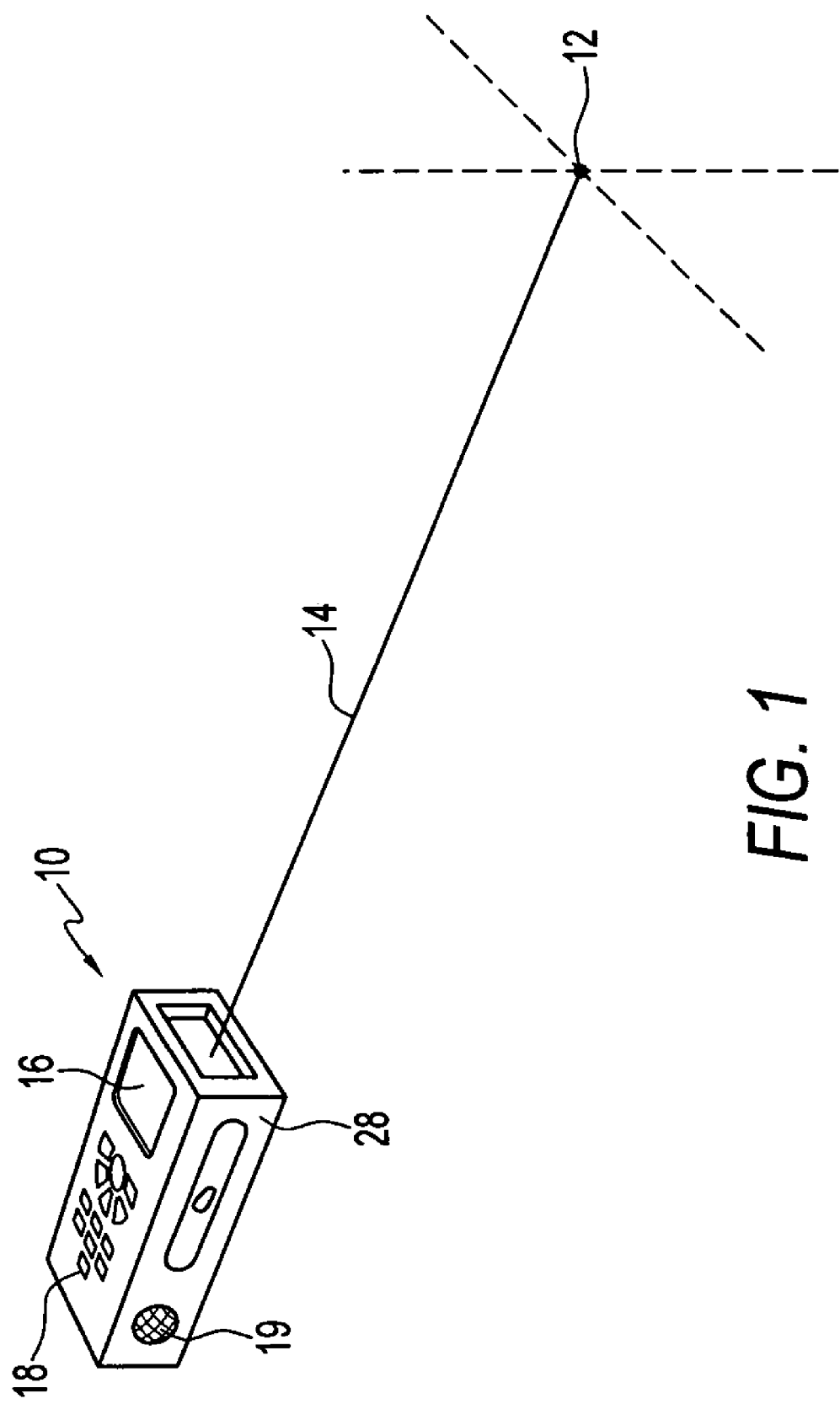
FIG. 1 is a schematic diagram of a handheld optical measurement device of the invention and a target.

The invention concerns an optical measurement device. An optical measurement device of an exemplary embodiment of the invention is a low-cost, handheld device that is capable of measuring the distance and elevation of a target point. In addition, preferred embodiment devices can determine the relative position between two or more target points.

In preferred embodiments, the distance and elevation, azimuth position, or relative angular position of each target point may be interpolated automatically from a plurality of automatic measurements taken in response to a user initiation of a measurement procedure. In this manner, jitter and other user induced movements that deviate the device alignment from the intended target point may be compensated. As an example, a user may initiate a measure on level operation through a user interface of the device. Beginning at an obviously inclined or declined from level point, the user sweeps a pointing indicator toward level. An audible tone in preferred embodiments signals the completion of a sweep to the user. Additionally, a tone may signal to the user that the sweep is being conducted improperly, e.g., too fast. The device takes distance measurements during the sweep and records the elevation at which each measurement was taken. If a measurement was taken at or close to exact level, that measurement may be used as a measurement on level. Otherwise, trigonometric calculations are performed from a plurality of the points and elevations to determine the measurement on level.

In preferred embodiment devices an accelerometer is used to measure angular position, e.g., elevation. In additional preferred embodiment devices, a dual axis accelerometer is used to provide elevation and azimuth. An equivalent to a dual axis accelerometer is two single axis accelerometers used in a configuration, e.g., orthogonal, so that elevation and azimuth may be determined for each measured distance point. Similarly, a dual axis inclinometer or multiple single axis inclinometers may be used. The azimuth information opens the possibility of additional determinations through trigonometric calculations.

An embodiment of the invention is an optical distance measurement device that includes a visual pointing indicator, an accelerometer or inclinometer, an optical distance measurement engine controlled by a controller, and user interface in a small handheld module. Preferred embodiment measurement devices use point measurements to determine, for example, estimates of chord distance, the area boarded by measurement points or volume, inclinations of surfaces, measurements on level or measurements on a selected angle of inclination. Data points from the distance measurement device, which can be based, for example, on optical triangulation, phase difference or time-of-flight delay measurement, are correlated with elevation and/or azimuth position. For example, the output of the angular position engine can be converted to elevation angle directly when oriented relative to gravity. In addition, output of the angular position engine can be single or double integrated to provide rate or angular position information.

A preferred optical distance measurement engine is a optical time-of-flight distance measurement engine. A preferred optical time-of-flight distance measurement engine is disclosed in Lewis et al., U.S. Pat. No. 6,829,043, entitled Distance Measurement Device with Short Distance Optics, issued on Dec. 7, 2004 ("the '043 patent").

Some preferred embodiment devices will now be discussed with reference to the drawing figures. FIG. 1 illustrates a handheld optical measurement device 10 making taking a distance measurement of a target 12. The device 10 emits a visible pointing indicator 14 that permits a user to point a beam, typically infrared, at the target 12. Other methods of alignment may also be used, e.g., optical sights. The device 10 includes a display 16 that can display, for example, the elevation and distance of the measurement taken of the target 12. The display 16 may also display user menus and directions, and forms part of the device's user interface with an input keypad 18 that permits a user to select device operations. A speaker 19 provides an audible output, for providing a user with a warning or an indication of a completed measurement, for example.

Figure 2:
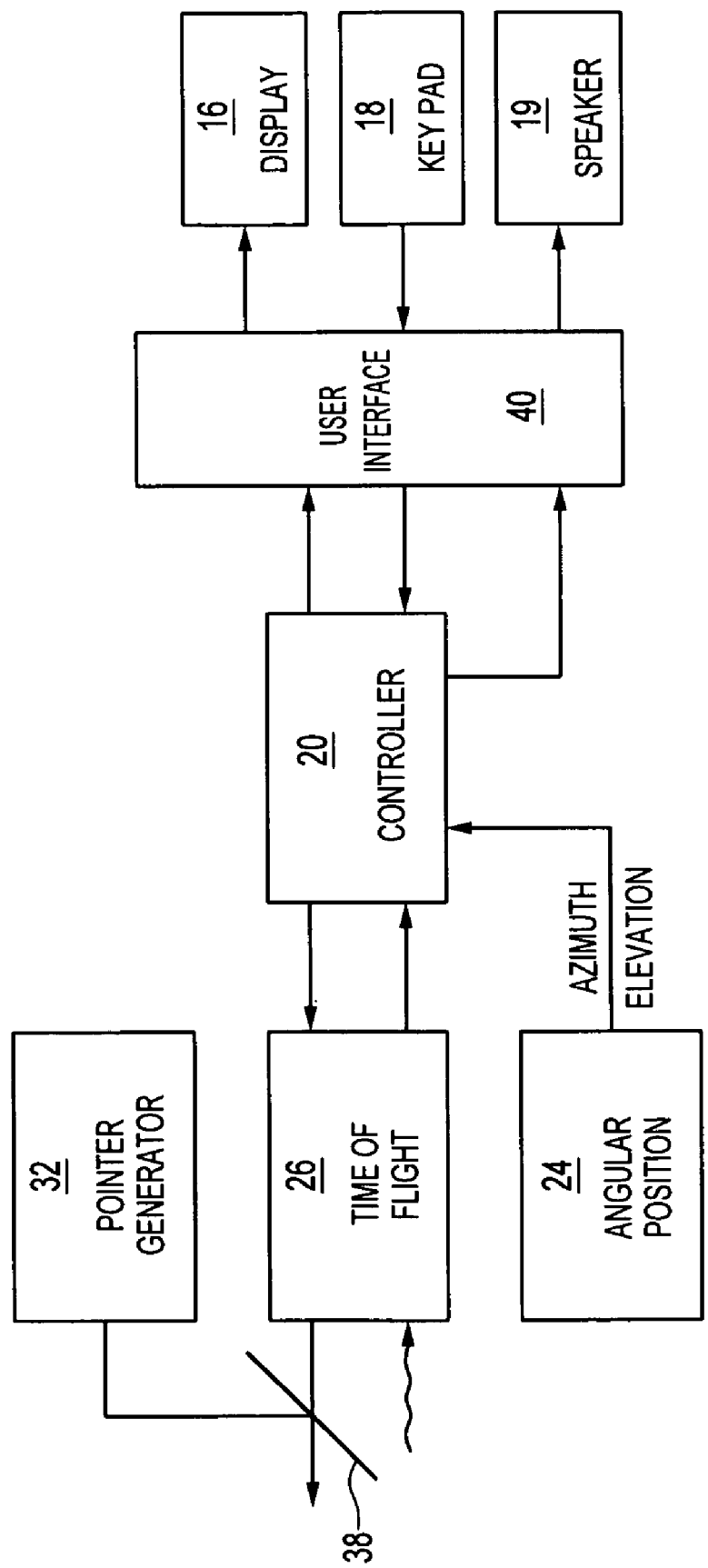
FIG. 2 is a block diagram of the handheld optical measurement device of FIG. 1

FIG. 2 illustrates the electronic and optical system of the optical measurement device 10 in a high level block diagram. The optical distance measurement device 10 provides distance measurements initiated by controller 20. A dual axis angular position engine (e.g., one or more accelerometers or inclinometers) 24 provides periodic updates of elevation and azimuth position to the controller 20. The controller 20 may include memory for storing measurements and calculations, and may also output data to another device, e.g., a computer, through a wired or wireless connection, e.g., Bluetooth. In another embodiment, a single axis angular position engine provides one of the elevation or azimuth position depending upon the orientation of the device 10. While accelerometers are inclinometers are preferred, other types of angular engines may also be used, including electronic and mechanical devices. A pendulum is an example mechanical device. Generally, mechanical devices will have more lag. The accelerometer(s) and inclinometer(s) of preferred embodiments have a quick response, are inexpensive, compact and may be easily fixed relative to the preferred time-of-flight optical engine of the '043 patent.

Figure 3:
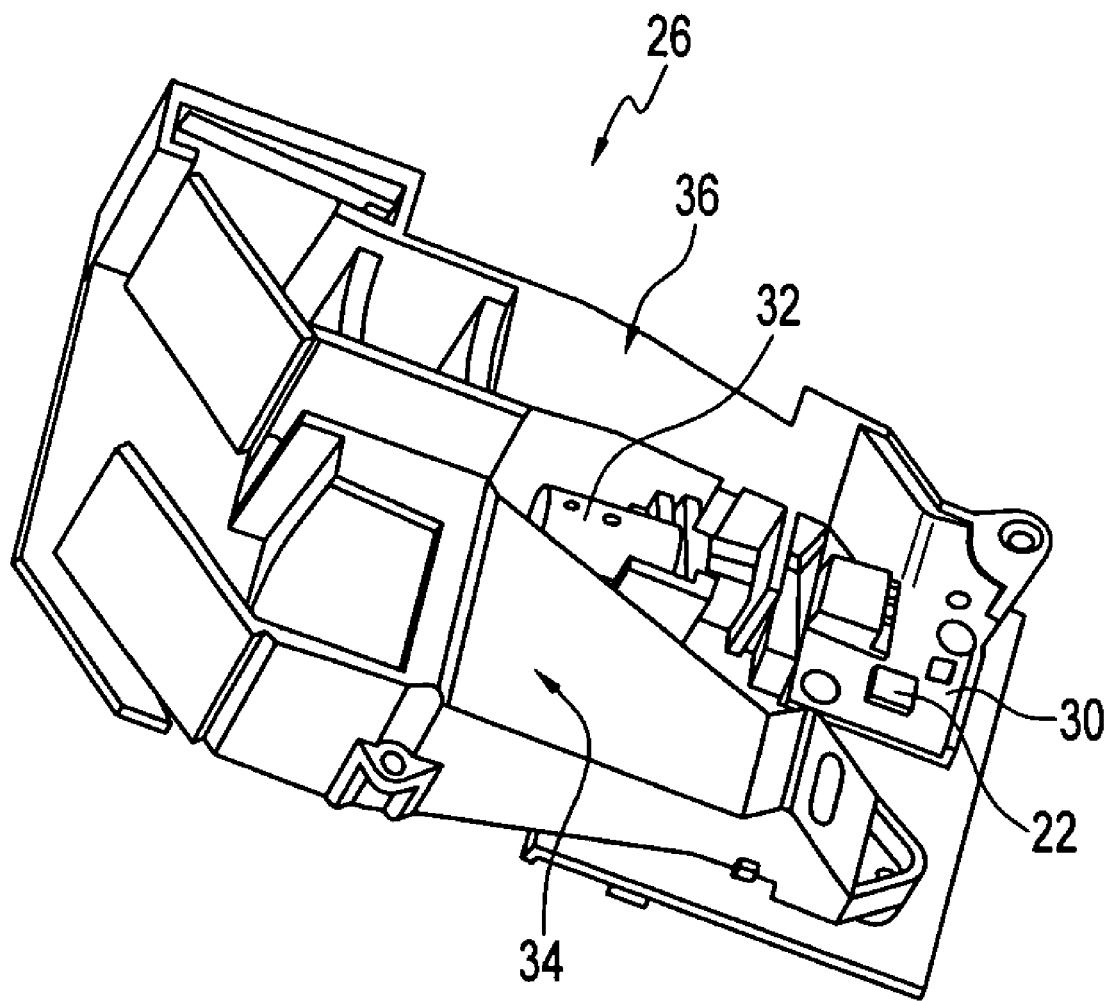
FIG. 3 illustrates an optical distance measurement engine.

FIG. 3 illustrates a preferred arrangement for an accelerometer 22 on a time-of-flight distance measurement engine 26. The mounting of the accelerometer to the time-of-flight distance measurement engine 26 reduces influence of flexure or vibration of a housing 28 (see FIG. 1) on the accelerometer 22. The time-of-flight distance measurement engine 26 includes a rigid substrate 30 that reduces impact of housing flexure and vibration. A pointer generator 32 generates the pointing indicator 14, e.g., a laser beam. An emission optical engine and optics 34 provide a target beam, e.g., infrared, and its time-of-flight is measured by a sensing optical engine and optics 36. The '043 patent may be referenced for additional operation details.

The pointer generator output is aligned with the target beam by a dichroic mirror 38 to provide the user with an indication of the pointing location using the visible beam 14 or through another technique such as a virtual display. A user interface 40 controls the display 16 and keypad 18 to provide a user the ability to select the operating mode, enable the visible pointing indicator 14 and to allow the user to initiate one or more distance, area, volume, chord, or other measurements. The controller 20 correlates azimuth and/or elevation data from the angular position engine 24 with distance measurements to establish the relative coordinates of measured points. The user display 16 can provide the user a summary of the distance and angle to measures points along with calculated parameters such as chord distance, area of a surface or opening or volume of a region.

Figure 4:
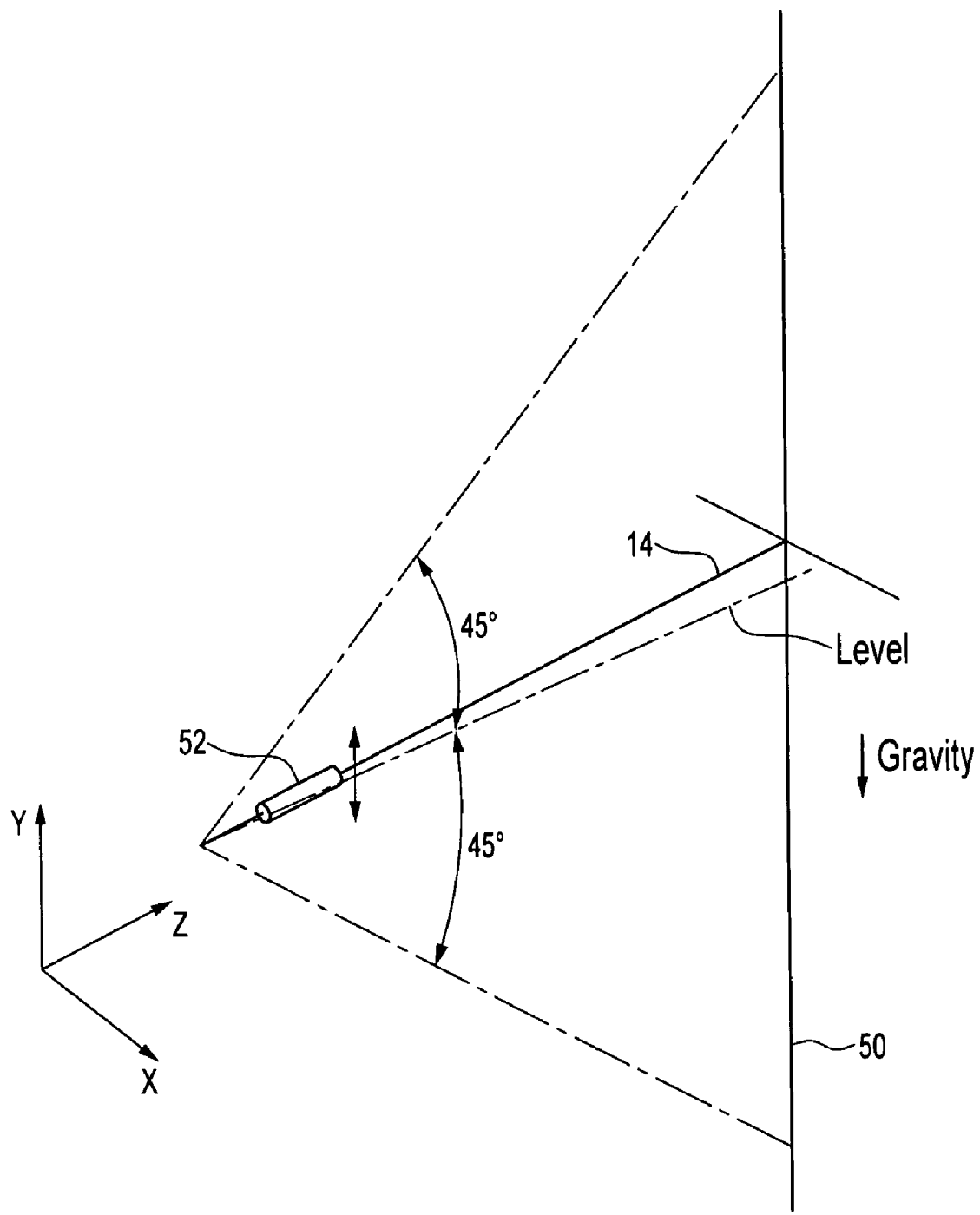
FIG. 4 illustrates a measure on angle, e.g., level, operation.

Some types of measurements and calculations conducted by the controller 20 to determine measured parameters will now be discussed to illustrate additional features of a preferred embodiment device. FIG. 4 illustrates a measure on level operation relative to a target surface 50, e.g., a wall. A single axis angular measurement engine 52 is oriented to measure elevation angle level of the line-of-sight of the pointing indicator 14. Using this single axis configuration, the height of a single point on the target surface 50 can be estimated from the measured distance and elevation angle or the distance can be measured to a given desired angle or on level. Using only a single axis accelerometer, for example, angles up to +/−45 degrees relative to normal or vertical can be obtained with good accuracy. In the measure on angle mode, the beam can be swept along a surface until a given angle (which may be level) is reached at which time the distance is estimated. When the distance measurement time is long relative to the change in distance due to the sweep rate, multiple distance measurement points can be correlated with elevation angle to allow the interpolation of distance at a given angle or at level. Also, based upon sweep rate or other criteria, for example, an indication of measurement tolerance can be calculated and displayed. A common application for a measure on angle capability is to initiate a measurement on level, or plumb in the case when the unit is in a vertical orientation.

Figure 5:
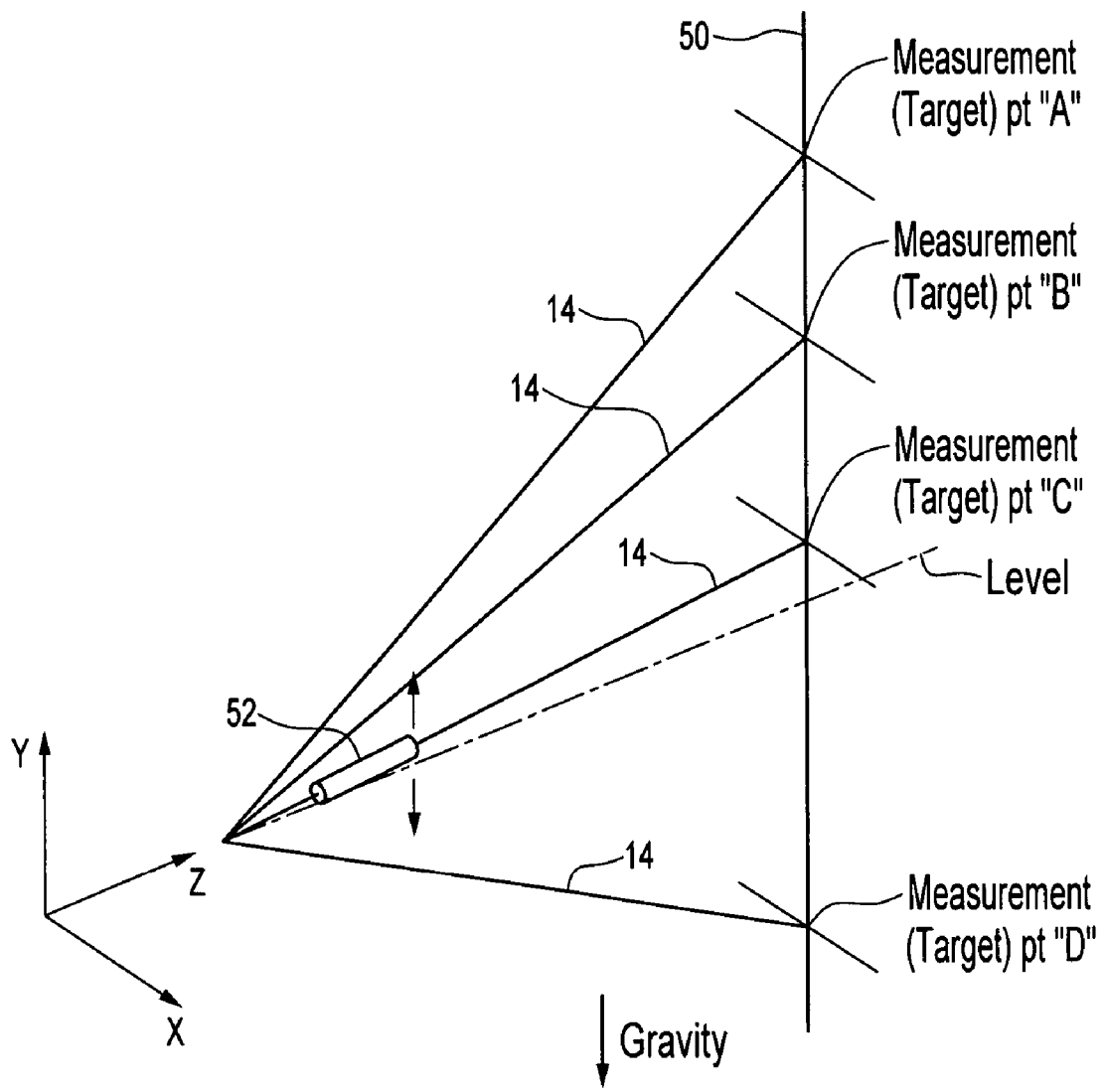
FIG. 5 illustrates a multiple target point measure on angle operation.

FIG. 5 illustrates a sweep permitting the controller to interpolate the distance at a particular angle including, for example, level. Here, a measurement sequence is initiated by the user with the keypad 18. A sweep is begun at measurement point "A" on the surface 50. The sweep continues through points "B", "C" and "D", passing through level or another angle of interest. With trigonometric calculations, the controller determines the distance of the surface 50 at level or another angle of interest. In the case where the angular scan rate causes a large change in distance at consecutive measurement points, the controller 20 may employ an algorithm that takes a linear interpolation of two consecutive data points taken during the course of the sweep. Linear interpolation is performed by a simple linear function joining the two consecutive data points (angular reading, distance). An alternative approach uses trigonometric prediction allowing the use of a single point within the +/−β degree. The angular measurement engine determines the current angle at which the measurement is given, then by using the ordinary trigonometry function (cosine), the leveled value can be calculated.

For example, in a preferred embodiment consistent with FIG. 2, angular position engine 24 is a free running subsystem which sends out signals (analog voltage) continuously as soon as there is power to the unit. When a user starts a measurement function, e.g. measure-on-level, the controller 20 takes a precise reading of angular position. Subsequently, the controller 20 polls the the angular position engine 24 for continuous measurement reading, e.g., at a rate of about 4 Hz. If the continuous measurement reading exhibits a sudden big change, then a precise reading will be taken in the next polling. The controller 20 is also executing an A/D conversion (or is provided with values from a converter) in free running mode, for example, running a sample period of under 300 µs. In a preferred embodiment, the controller 20 includes or uses memory that constitutes a circular buffer of 32 running values of these A/D conversion values. At each 10 ms timer interval, an average of these 32 values is calculated and will be kept in a so-called secondary buffer. In an example embodiment, there are eight of these secondary buffers (also called circular buffers), which can thus store a most recent 80 ms of averaging A/D values. For every distance reading obtained, irrespective to whether it is a precise or a continuous reading, an average of the 8 secondary readings can be used to work out the current inclination. When inclination falls within +/−β degrees (where β is predefined limit, e.g., 2 degrees), the measurement so taken will be used to work out the actual distance by the following formula: Actual distance=Range engine reported distance*cosine(x), where x is the measured inclination within +/−β degrees. This preferred method for estimation often avoids the delay, e.g., of about 1 second, that can be required for taking a precise reading from the angular position engine.

Figure 6:
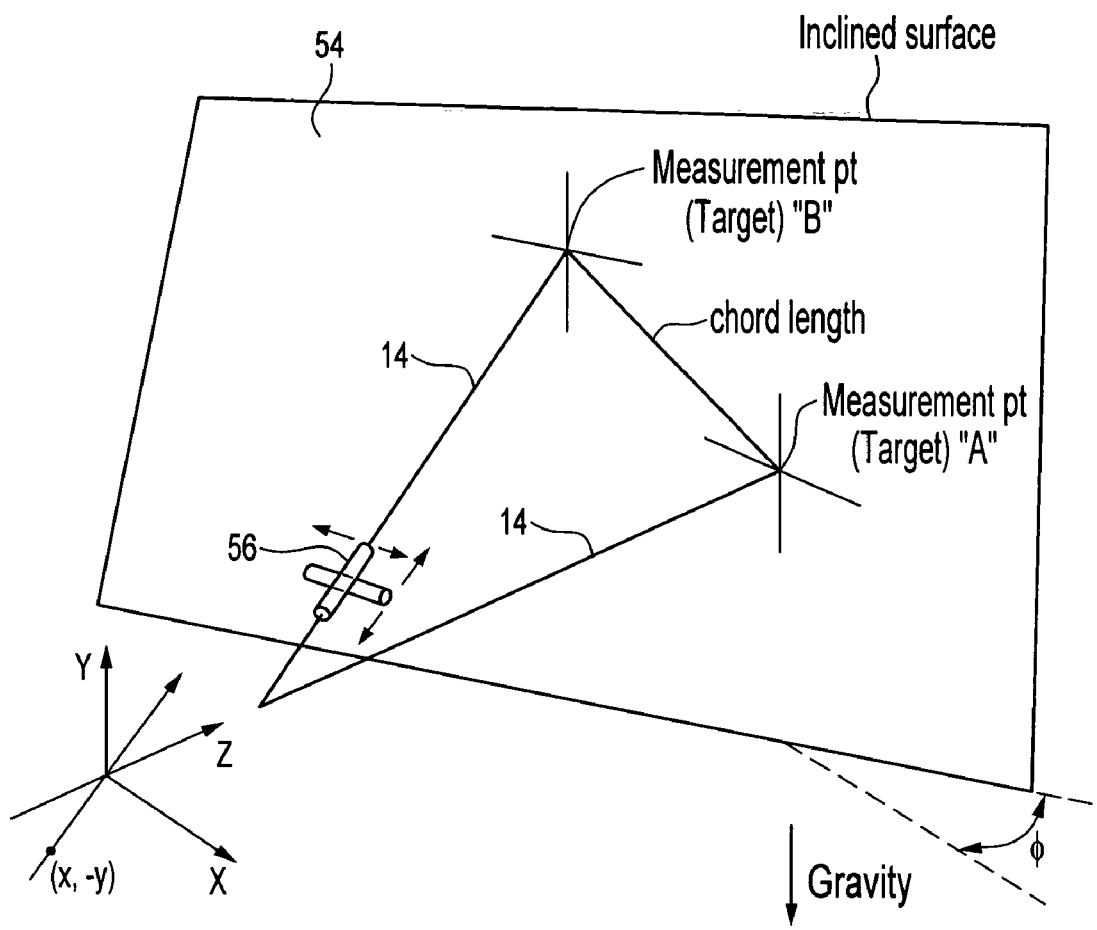
FIG. 6 illustrates the measurement of chord length and area on an inclined plane.

FIG. 6 illustrates a dual axis measurement of an inclined surface 54. A dual axis angular measurement engine 56, e.g., two orthogonal mounted accelerometers or inclinometers, can provide 360 degrees of elevation sensitivity or the capability to measure azimuth and elevation over a region in space. The capability to measure both azimuth and elevation provides the option of measuring the relative location of distant points to provide chord lengths, area or volume. Here, measurement points "B" and "A" are on the surface 54 which is inclined relative to plumb. The points "A" and "B" are separated by a chord length. If another point is added, area can be determined. Additional points permit volume determination. In this embodiment of the invention, the user would point to a series of locations on the surface 54 (or object) bounding the measurement zone of interest. The user would select the mode of operation, (chord, area or volume) and then begin taking measurements to edge points. The first measurement in the series would establish the initial coordinate in azimuth, elevation and distance. The user would then scan to the next measurement location pivoting the unit around an arbitrary rotational axis. The best performance can be achieved using a tripod mount, however for most estimation applications handheld operation is adequate.

While dual axis angular position engines are preferred, it is possible to use a single axis engine for multiple axis determinations. The orientation of an accelerometer could be repositioned using a mechanism controlled by a rotating or linear translating actuator. A switch coupled to the mechanism would reconfigure the processing of the accelerometer outputs to suit the desired configuration. The user could thus reconfigure the inertial sensitivity of the module to match the measurement need. For example, a single-axis accelerometer could be reoriented 90 degrees in the vertical plane to provide elevation operation near vertical or horizontal. Rotating the sensitivity axis of the accelerometer 90 degrees could be used to provide azimuth sensitivity.

Figure 7:
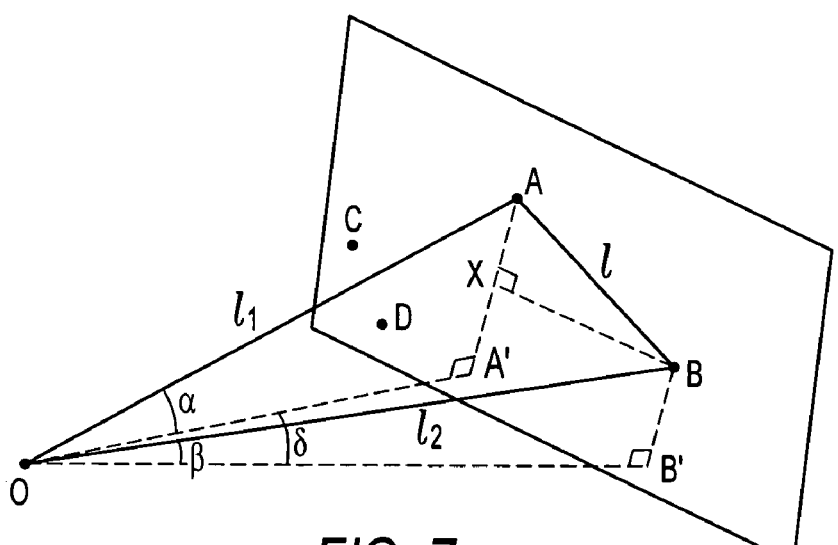
FIG. 7 illustrates calculations for the chord length AB, an area for a triangle ABC and a polygon area ABCD.

FIG. 7 illustrates the projections viewed by the controller 20 to calculate the cord length l between points "A" and "B" on a generalized surface in space. If an additional measurement point "C" is added, an area may also be calculated. An additional measurement point "D" permits the calculation of an area bounded by four points. The calculations with reference to FIG. 7 are now set forth.

A first calculation of interest is for the chord length l. The azimuth angle δ is defined by A'0B'=δ. Point A has an angle of elevation of α defined by ∠A0A'=α. Point B has an angle of elevation β defined by ∠B0B'=β. Lengths for the sides of the AOB triangle are defined as OA=$l_1$, OB=$l_2$ and AB=l. The length of l is given by $l^2=(Ax)^2+(Bx)^2$, where Ax is the length between A and x and Bx is the length between B and x. This length may therefore be expressed as $=(Ax)^2+(A'B')^2$, where A'B' is the length between A' and B'. Applying the cosine rules gives $(A'B')^2=l_1^2 \cos^2\alpha+l_2^2 \cos^2\beta-2l_1l_2 \cos\alpha \cos\beta \cos\delta$ (cosine rule against ΔA'0B'). Then, Ax=AA'−BB', where AA' is the length between A and A' and BB' is the length between B and B'.

$$l_1 \sin\alpha - l_2 \sin\beta$$

$$(Ax)^2 = (l_1 \sin\alpha - l_2 \sin\beta)^2$$

$$= l_1^2 \sin^2\alpha + l_2^2 \sin^2\beta - 2l_1 l_2 \sin\alpha \sin\beta$$

$$l^2 = l_1^2 \sin^2\alpha + l_2^2 \sin^2\beta - 2l_1 l_2 \sin\alpha \sin\beta + l_1^2 \cos^2\alpha + l_2^2 \cos^2\beta - 2l_1 l_2 \cos\alpha \cos\beta \cos\delta$$

Simplifying, $l^2 = l_1^2 + l_2^2 - 2l_1 l_2 (\sin\alpha \sin\beta + \cos\alpha \cos\beta \cos\delta)$ Further to the calculation to find the length of cord l in 3D space as described above, lengths of the triangle formed by three points A, B, C can be obtained in similar way. If the three sides of a triangle ABC defined by three chord lengths a, b, c, the chord lengths are calculated as above. With the lengths a, b, and c determined, the area of the corresponding triangle can be calculated by Heron's formula:

$$\text{Area of triangle} = \sqrt{s(s-a)(s-b)(s-c)}$$

$$\text{where } S = \frac{1}{2}(a+b+c) - \text{semi-perimeter of triangle.}$$

A polygon ABCD in a plane defines a 4 point area that may also be calculated. A simple technique is to divide the polygon into two triangles. Then the area of polygon is merely the sum of two triangular shapes ABD and BED. Those areas can be calculated as described above.

The set of exemplary calculations may be extended to additional shapes, areas and volumes, as will be appreciated by artisans. Other trigonometric solutions may also be employed. A device of the invention obtains coordinates in space for sets of target points that enable solutions for various lengths, areas, volumes, arcs, diameters, etc., as will be appreciated by artisans.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention.

The invention claimed is:

1. A handheld optical distance measurement device, the device comprising:
   a distance measurement engine;
   an angular position measurement engine; and
   a controller that controls the distance measurement engine and associates one of an elevation, azimuth position, or relative angular position from the angular position measurement engine with distance measurements taken from the distance measurement engine;
   memory for storing the distance measurements from said distance measurement and the one of an elevation, azimuth position, or relative angular position from said angular position engine;
   an algorithm stored in said memory for calculating measurements that depend upon both of the distance measurements from said distance measurement and the one of an elevation, azimuth position, or relative angular position from said angular position engine;
   a user interface including a display that can display elevation and distance of a measurement taken of a target, and an input keypad that permits a user to select device operations;
   a visible pointing indicator that permits a user to point an indicator beam at a target.

2. The device of claim 1, wherein said angular position engine comprises an inclinometer.

3. The device of claim 2, wherein said distance measurement engine comprises a time-of-flight distance measurement engine.

4. The device of claim 1, further comprising a user interface that permits a user to control taking of measurement, and wherein said controller associates each target point measured from a target under the control of a user with one of an elevation and azimuth position obtained from said angular position engine.

5. The device of claim 4, wherein said controller associates each target point measured from a target under the control of a user with both an elevation and azimuth position obtained from said angular position engine.

6. The device of claim 5, wherein said controller determines a set of relative coordinates in space for a plurality of related target points.

7. The device of claim 1, wherein said angular position engine comprises an accelerometer mounted on a common rigid substrate with said distance measurement engine.

8. The device of claim 1, wherein said angular position engine comprises a dual axis inclinometer.

9. A handheld optical distance measurement device, the device comprising:
   a distance measurement engine;
   an angular position measurement engine; and
   a controller that controls the distance measurement engine and associates one of an elevation, azimuth position, or relative angular position from the angular position measurement engine with distance measurements taken from the distance measurement engine;
   memory for storing the distance measurements from said distance measurement and the one of an elevation, azimuth position, or relative angular position from said angular position engine; and
   an algorithm stored in said memory for calculating measurements that depend upon both of the distance measurements from said distance measurement and the one of an elevation, azimuth position, or relative angular position from said angular position engine; and
   a user interface including a display that can display elevation and distance of a measurement taken of a target, and an input keypad that permits a user to select device operations;
   a visible pointing indicator that permits a user to point an indicator beam at a target; and
   a speaker that provides an audible output to a user that indicates a warning or an indication of a completed measurement.

10. The device of claim 9, wherein said angular position measurement engine comprises a dual axis angular position measurement engine that provides periodic updates of elevation and azimuth position to said controller.

11. The device of claim 10, wherein the display is controlled by said controller to further display user menus and directions.

12. A handheld optical distance measurement device, the device comprising:
   a distance measurement engine;
   an angular position measurement engine; and
   a controller that controls the distance measurement engine and associates one of an elevation, azimuth position, or relative angular position from the angular position measurement engine with distance measurements taken from the distance measurement engine;
   memory for storing the distance measurements from said distance measurement and the one of an elevation, azimuth position, or relative angular position from said angular position engine; and
   an algorithm stored in said memory for calculating measurements that depend upon both of the distance measurements from said distance measurement and the one of an elevation, azimuth position, or relative angular position from said angular position engine, and wherein said distance measurement engine comprises a time-of-flight distance measurement engine, the device further comprising:
   a pointer generator to generate a indicator beam as a pointing indicator; and
   an emission optical engine to generate a time-of-flight target beam;
   means for aligning said time-of-flight target beam and said indicator beam; and
   a sensing optical engine and optics to sense time-of-flight of said time-of-flight target beam.

13. A handheld optical distance measurement device, the device comprising:
   a distance measurement engine;
   an angular position measurement engine; and
   a controller that controls the distance measurement engine and associates one of an elevation, azimuth position, or relative angular position from the angular position measurement engine with distance measurements taken from the distance measurement engine;

memory for storing the distance measurements from said distance measurement and the one of an elevation, azimuth position, or relative angular position from said angular position engine; an algorithm stored in said memory for calculating measurements that depend upon both of the distance measurements from said distance measurement and the one of an elevation, azimuth position, or relative angular position from said angular position engine;

a user interface including a display that can display measurements calculated by the algorithm, and an input keypad that permits a user to select device operations to obtain display of one or more measurements that can be calculated by the algorithm.

14. The device of claim 13, wherein said angular position engine comprises an inclinometer.

15. The device of claim 13, wherein said angular position engine is mounted on a common rigid substrate with said distance measurement engine.

* * * * *